United States Patent [19]
Sekiguchi

[11] Patent Number: 5,842,752
[45] Date of Patent: *Dec. 1, 1998

[54] HYDRAULIC PRESSURE UNIT WITH ELECTRIC MOTOR AND PUMP

[75] Inventor: Akihiko Sekiguchi, Saitama, Japan

[73] Assignee: Akebono Brake Industry Co., Ltd., Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 701,137

[22] Filed: Aug. 21, 1996

[30] Foreign Application Priority Data

Aug. 21, 1995 [JP] Japan ................................. 7-211536

[51] Int. Cl.$^6$ ................................. B60T 8/34; H02K 7/06
[52] U.S. Cl. .................................... 303/116.4; 471/415
[58] Field of Search ..................... 303/116.4, 113.1; 417/415, 360, 410.1

[56] References Cited

U.S. PATENT DOCUMENTS

| | | | |
|---|---|---|---|
| 2,698,394 | 12/1954 | Brown | 417/415 X |
| 3,612,728 | 10/1971 | Fulmer | 417/415 |
| 5,281,013 | 1/1994 | Pichon et al. | 303/116.4 |
| 5,509,790 | 4/1996 | Schuderi et al. | 417/415 X |

*Primary Examiner*—Peter M. Poon
*Attorney, Agent, or Firm*—Morgan, Lewis & Bockius LLP

[57] ABSTRACT

In a hydraulic pressure unit with a pump 5 and an electric motor 10 for driving the pump 5, wherein a rotary shaft 1 of the motor has one end portion which is rotatably supported by a first bearing 3 in the cover 4 of the electric motor, and the other end portion which is extended outside the cover 4 of the motor and is rotatably supported by a second bearing 7 in a housing 11 forming the hydraulic pressure unit, and a load action point 2 for driving the pump is provided on the extension of the rotary shaft 1 in such a manner that the load action point is closer to the cover 4 than the bearing 7 in the housing.

13 Claims, 2 Drawing Sheets

HYDRAULIC PRESSURE UNIT WITH ELECTRIC MOTOR AND PUMP

BACKGROUND OF THE INVENTION

1. Field of the Invention

The present invention relates to a hydraulic pressure unit in which a pump is operated with an electric motor, and more particularly to a hydraulic pressure unit which is suitable for an anti-lock fluid-pressure control system.

2. Related Art

During emergency braking, or when a vehicle is braked on a slippery road, an anti-lock brake device detects the slipping of a wheel, and outputs a control signal according to a predetermined theory to control the hydraulic pressure of the brake system thereby to maintain the vehicle stable, to allow the operator to steer it safely, and to reduce the braking distance. Hence, there have been developed a variety of anti-lock brake devices in the art. The conventional anti-lock brake device employs a pump for controlling the hydraulic pressure of the brake system. The pump is generally driven by an electric motor.

As conducive to an understanding of the anti-lock brake device, the arrangement of a hydraulic pressure unit having an electric motor and a pump for an anti-lock brake device, will be described in brief which has been disclosed by Unexamined Japanese Patent Application (OPI) No. Hei. 3-253241 (the term "OPI" as used herein means an "unexamined publication application").

FIG. 2 is a sectional view showing a first example of the conventional hydraulic pressure unit. In FIG. 2, reference numeral 51 designates a motor body; 52, a frame yoke; 53, an armature; 54, a cover; 55, an eccentric cam; 56, a plunger piston bearing; 57, a rotary shaft; 58a and 58b, bearings built in the cover. Those essential components are arranged in the same manner as those of an ordinary hydraulic pressure unit. The armature, the rotary shaft, the bearings, etc. are accommodated in one and the same cover 54; that is, the motor is provided as one individual unit. On the other hand, the pump 61 is built in a housing 60. The electric motor 51 is fitted in a fitting section provided in the housing 60, and secured thereto with suitable fixing means.

As was described above, the pump 61 is built into the housing 60, and it is a conventional one which produces a hydraulic pressure by reciprocating its plunger piston 62. The latter 62 is extended through a through-hole formed in the cover of the motor, and abutted against the aforementioned eccentric cam 56 through the bearing 56.

Hence, as the rotary shaft of the motor is rotated, the plunger piston is moved up and down through the eccentric cam 55. As the plunger piston is operated in this manner, in the pump the inlet valve opens a brake fluid path to the outlet valve, so that the hydraulic fluid in the wheel cylinder is sent through the reservoir in the unit to the accumulator, whereby the hydraulic pressure is reduced to eliminate the locking of the wheel.

FIG. 3 shows a second conventional hydraulic pressure unit comprising an electric motor and a pump. In the unit, the rotary shaft 57 of the motor is supported with two bearings 58a and 58b built in the cover, and it is extended outside the cover. The outer end portion of the rotary shaft 57, which is located outside the cover, is supported with a bearing 58c built in a housing 60. An eccentric cam 55 is mounted on the part of the rotary shaft 57 which is located near the bearing 58c of the housing 60 and is protruded from the cover 54 of the motor. With the aid of the eccentric cam 55 thus mounted, the plunger piston 62 of the pump 61 is reciprocated to produce a hydraulic pressure similarly as in the above-described first conventional hydraulic pressure unit.

In the above-described first conventional hydraulic pressure unit, the rotary shaft of the motor is supported by the two bearings built in the cover. Hence, in order to allow the plunger piston of the pump to abut against the eccentric cam mounted on the rotary shaft, it is necessary to make a hole in the cover, and it is rather troublesome to combine the plunger piston and the eccentric cam with each other. Furthermore, as was described before, the motor fixedly set in the cover is fitted in the fitting section provided in the housing. Hence, the housing and the cover must be assembled with high accuracy. If the cover is not positively fitted in the fitting section, the former may be oscillated therein even by the reciprocation of the plunger piston.

In the second conventional hydraulic pressure unit, the rotary shaft 57 of the motor is supported by the two bearings 58a and 58b built in the cover, and the part of the rotary shaft 57 which is located outside the cover is supported with the bearing 58c built in the housing. Hence, the second conventional hydraulic pressure unit is free from the above-described difficulties accompanying the first conventional hydraulic pressure unit. However, it is necessary to provide three bearings as a whole to support the rotary shaft of the motor; that is, the second hydraulic pressure unit is disadvantageous in manufacturing cost when compared with the first hydraulic pressure unit.

Furthermore, in each of the above-described two conventional hydraulic pressure unit, the motor must be assembled as one unit, and inspected when assembled; and thereafter when the hydraulic pressure unit is assembled by joining the motor to the pump, it is necessary to inspect the hydraulic pressure unit thus assembled. That is, in order to produce one hydraulic pressure unit, it is necessary to perform two inspections.

SUMMARY OF THE INVENTION

Accordingly, an object of the invention is to eliminate the above-described difficulties accompanying a conventional hydraulic pressure unit. More specifically, an object of the invention is to provide a hydraulic pressure unit which is manufactured as follows: An electric motor, which is a semi-manufactured product, is formed with the employment of the bearing eliminated which is an essential component in the second conventional hydraulic pressure unit; and the electric motor thus formed is joined to a pump built in the housing. Hence, the hydraulic pressure unit of the invention is advantageous in that, in the manufacture thereof, the number of times of inspection may be only once, and the number of components is reduced as much.

The foregoing object of the invention has been achieved by the provision of a hydraulic pressure unit with a pump, and an electric motor for driving the pump; in which, according to the invention, the rotary shaft of the motor has one end portion which is rotatably supported by a first bearing provided in the cover of the electric motor, and the other end portion which is extended outside the cover of the motor and is rotatably supported by a second bearing provided in a housing forming the hydraulic pressure unit, and a load action point for driving the pump is provided on the extension of the rotary shaft in such a manner that the load action point is closer to the cover than the bearing in the housing.

BRIEF DESCRIPTION OF THE DRAWING(S)

FIG. 1 is a diagram showing a hydraulic pressure unit, which constitutes an embodiment of the invention; and FIGS. 2 and 3 are diagrams showing first and second examples of a conventional hydraulic pressure unit.

DESCRIPTION OF THE PREFERRED EMBODIMENTS

One preferred embodiment of the invention will be described with reference to FIG. 1.

Figure 1:
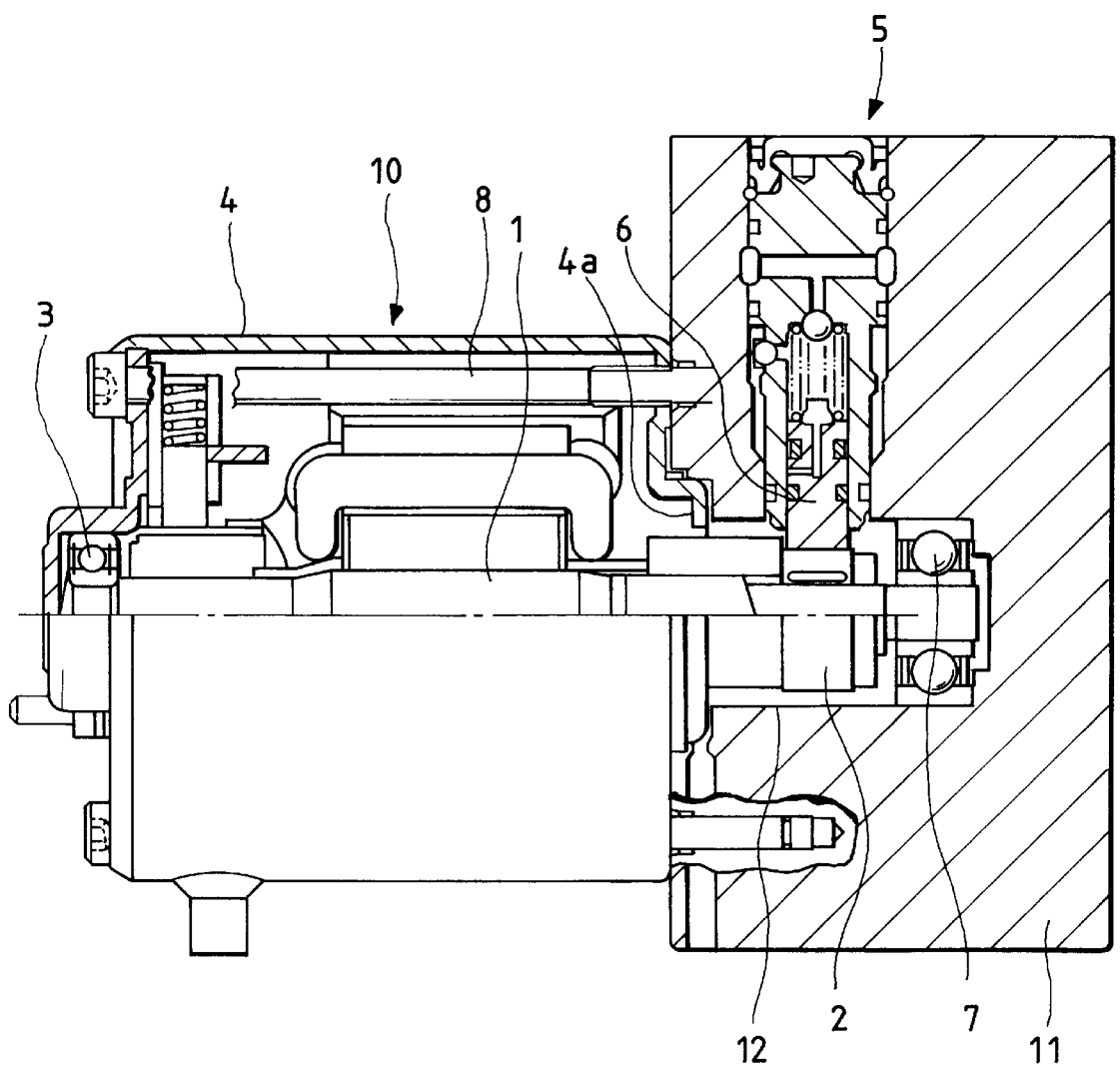
Figure 2:
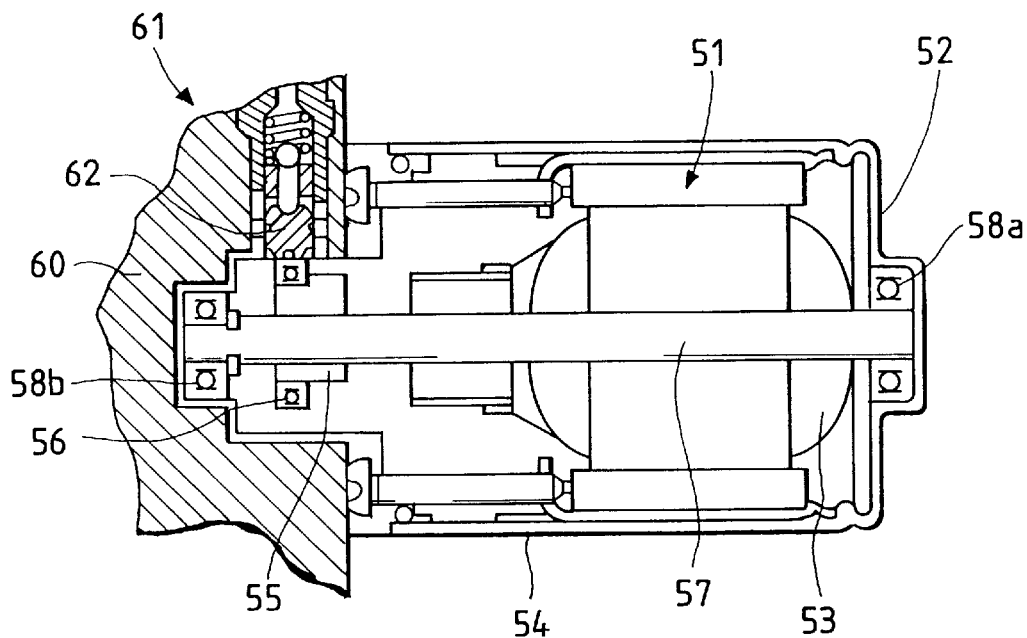
Figure 3:
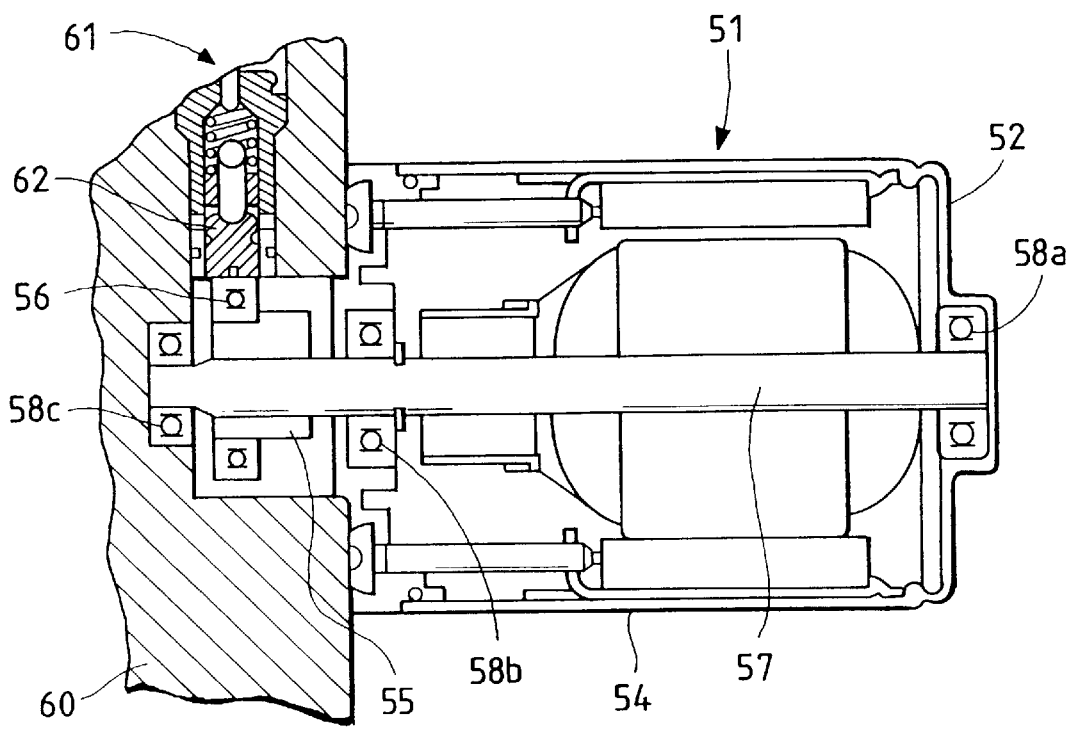

FIG. 1 is a sectional view showing a hydraulic pressure unit according to the invention, which comprises an electric motor and a pump. The body of the electric motor is equal in fundamental structure to that of a conventional one.

In FIG. 1, reference numeral 10 designates the aforementioned electric motor; 1, the rotary shaft of the motor body; 2, an eccentric cam mounted on the rotary shaft 1; and 3, a bearing built in the cover of the electric motor. On end portion of the rotary shaft 1 of the electric motor 10, which is provided inside the cover 4, is rotatably supported by the aforementioned bearing 3 provided in the cover. The other end portion of the rotary shaft 1 is extended outside through a hole 4a formed in the cover. In order to drive the plunger piston (described later) of the pump, the eccentric cam (or load action point) 2 is mounted on the other end portion of the rotary shaft thus extended outside the cover. Before joined to a housing 11, the electric motor is a so-called "semi-manufactured product" in which the portion of the rotary shaft which is outside the cover is free.

On the other hand, the housing 11 has a fitting hole 12 into which the rotary shaft 1 of the motor is fitted. A bearing 7 is set near the bottom of the fitting hole 12, to rotatably support the rotary shaft 1 of the motor. The housing 11 has a conventional reciprocation type pump 5 in such a manner that the plunger piston 6 of the latter 5 goes into the fitting hole 12 of the housing 11.

The rotary shaft 1 of the motor 10, the semi-manufactured product, is fitted in the fitting hole 12 of the housing, and the end portion of the rotary shaft 1 is rotatably supported with the bearing 7. In this case, the motor is joined to the housing in such a manner that the eccentric cam 2 mounted on the rotary shaft is abutted against the plunger piston 6 of the pump 5. Under this condition, the motor 10 and the housing 11 are secured with each other with suitable means 8 such as screws. Thus, the hydraulic pressure unit has been manufactured.

When the motor is driven; that is, when the rotary shaft is rotated, the plunger piston is moved up and down (as viewed in FIG. 1) by the eccentric cam on the rotary shaft which is located inside the fitting hole, thus performing a pumping action.

In the above-described embodiment, the portion of the motor cover which is mounted on the housing is extended near to the axis of the motor; however, the invention is not limited thereto or thereby. That is, the cover may be modified in configuration; for instance, the cover may have a flange which is radially outwardly extended. In this modification, the hydraulic pressure unit is also reduced in weight.

As was described above, the hydraulic pressure unit is manufactured by joining the electric motor unit, which is a semi-manufactured product, to the pump built in the housing. Hence, the hydraulic pressure unit is free from the difficulty that the motor must be assembled as one unit, and inspected when assembled. That is, the hydraulic pressure unit is inspected only once when assembled as a complete product. This means that the inspection of the hydraulic pressure unit of the invention is greatly simplified. Furthermore, with the hydraulic pressure unit of the invention, unlike the conventional one, it is unnecessary to form the through-hole in the cover in which the plunger piston is extended, nor to support the rotary shaft of the motor with three bearings, which reduces the manufacturing cost as much. Moreover, with the hydraulic pressure unit of the invention, it is unnecessary to fix the electric motor in the housing fixing section which has been integrally fixed in the cover. This feature makes it unnecessary to combine the housing and the cover with each other with high accuracy. In addition, by modifying the method of joining the electric motor to the housing, the hydraulic pressure unit can be reduced in weight. Those effects or merits of the invention should be highly appreciated.

What is claimed is:

1. A hydraulic pressure unit having a housing comprising:
   an electric motor having a cover and a rotary shaft;
   said rotary shaft including a first end portion rotatably supported by a first bearing in said cover and a second end portion extending outside said cover, said second end portion of the rotary shaft being radially displaceable with respect to the cover prior to assembly of the electric motor in the hydraulic pressure unit, and being rotatably supported by a second bearing in the housing of the hydraulic pressure unit once assembled in the hydraulic pressure unit such that said rotary shaft is suspended between said first and second bearing and is otherwise unsupported by, and spaced from other elements of said pressure unit;
   a pump operatively coupled to said electric motor and accommodated in the housing of the hydraulic pressure unit; and
   a load action point mounted on said rotary shaft of said electric motor, said load action point being disposed on an extension of said rotary shaft closer to said cover than said second bearing in the housing.

2. The hydraulic pressure unit as claimed in claim 1, wherein said pump is a reciprocation type plunger pump having a plunger piston.

3. The hydraulic pressure unit as claimed in claim 2, wherein said plunger piston is reciprocated by an eccentric cam serving as said load action point.

4. The hydraulic pressure unit as claimed in claim 1, wherein said load action point comprises an eccentric cam.

5. An electric motor assembly for use with a hydraulic pump having a housing, a piston, and a shaft supporting bearing, comprising:
   a cover;
   an electric motor disposed in said cover;
   a first bearing disposed in said cover;
   a rotary shaft coupled to said electric motor, supported for rotation in said first bearing, and having a free end extending out of said cover, said cover extending along a length of said rotary shaft and having an end terminating prior to the location of a second bearing of said rotary shaft such that said free end of the rotary shaft extends beyond said end of the cover;
   a piston engaging portion disposed on said free end of the rotary shaft extending beyond the end of the cover; and
   a second bearing mount portion located on said free end of the rotary shaft and configured to be supported by the shaft supporting bearing; wherein
   said free end of the rotary shaft is radially displaceable with respect to the cover prior to assembly of the electric motor assembly with the hydraulic pump, and once said electric motor assembly is assembled to the hydraulic pump and said second bearing mount portion is mounted onto the shaft supporting bearing, the rotary shaft is suspended and axially fixed with respect to the cover by said first bearing and the shaft supporting bearing and is otherwise unsupported by and spaced from other elements of the electric motor assembly.

6. The electric motor assembly as claimed in claim 5, wherein the hydraulic pump is a reciprocation type plunger pump and said piston engaging portion includes a cam.

7. The electric motor assembly as claimed in claim 5, wherein said cover is configured to lock into a shoulder portion located in the pump housing during assembly of the electric motor assembly into the pump housing.

8. The electric motor assembly as claimed in claim 7, wherein the shoulder portion of the pump housing is configured to maintain said cover at a spaced distance from said rotary shaft when the electric motor assembly is assembled to the hydraulic pump.

9. The electric motor assembly as claimed in claim 5, further comprising:

at least one attachment device located on the cover for attaching the cover to the pump housing.

10. A method for assembling a hydraulic pressure unit, comprising the steps of:

providing an electric motor assembly including a cover having an electric motor and a first bearing located therein;

disposing a rotary shaft in said cover in engagement with said motor and with a first end disposed in said first bearing such that the rotary shaft is unsupported at its opposite second end and free to move in a radial direction within the cover;

providing a hydraulic pump assembly including a pump housing having a piston and a second bearing located therein;

inserting the second end of the rotary shaft into said second bearing to support said second end in said second bearing and in operative engagement with said piston and to provide a second support for the rotary shaft such that the rotary shaft is suspended from said first and second bearings and otherwise unsupported by and spaced from other elements of the hydraulic pressure unit.

11. The method for assembling a hydraulic pressure unit as claimed in claim 10, further comprising the step of:

attaching said cover to the hydraulic pump assembly with at least one attachment structure.

12. The method for assembling a hydraulic pressure unit as claimed in claim 10, further comprising the step of:

inserting said cover into a shoulder in said pump housing to lock the cover at a predetermined distance from the rotary shaft.

13. The method for assembling a hydraulic pressure unit as claimed in claim 12, wherein the step of inserting said cover into a shoulder occurs simultaneously with the step of inserting the second end of the rotary shaft into said second bearing.

* * * * *